(12) United States Patent
Cawse

(10) Patent No.: US 8,795,820 B2
(45) Date of Patent: Aug. 5, 2014

(54) COMPOSITE MATERIAL

(75) Inventor: John Leslie Cawse, West Wratting (GB)

(73) Assignee: Hexcel Composites Limited, Duxford (GB)

(*) Notice: Subject to any disclaimer, the term of this patent is extended or adjusted under 35 U.S.C. 154(b) by 1288 days.

(21) Appl. No.: 12/438,392

(22) PCT Filed: Aug. 23, 2007

(86) PCT No.: PCT/GB2007/003218
§ 371 (c)(1),
(2), (4) Date: Oct. 12, 2009

(87) PCT Pub. No.: WO2008/025959
PCT Pub. Date: Mar. 6, 2008

(65) Prior Publication Data
US 2010/0151214 A1   Jun. 17, 2010

(30) Foreign Application Priority Data

Aug. 26, 2006 (GB) .................................. 0616934.6

(51) Int. Cl.
*B32B 3/10* (2006.01)
(52) U.S. Cl.
USPC ........ 428/208; 428/195.1; 428/206; 428/212; 428/901
(58) Field of Classification Search
USPC .................. 428/195.1, 206, 208, 212, 901
See application file for complete search history.

(56) References Cited

U.S. PATENT DOCUMENTS

| | | | | |
|---|---|---|---|---|
| 3,969,177 A * | 7/1976 | Doran et al. | .................. | 156/288 |
| 5,565,267 A * | 10/1996 | Capote et al. | ................. | 428/344 |
| 5,672,226 A | 9/1997 | Deardorf | | |
| 2003/0064223 A1* | 4/2003 | Simmons et al. | ............. | 428/375 |
| 2003/0136580 A1 | 7/2003 | Chen et al. | | |
| 2004/0091622 A1* | 5/2004 | Fernandes et al. | ............ | 427/355 |
| 2004/0175548 A1* | 9/2004 | Lawrence et al. | .......... | 428/195.1 |
| 2005/0284232 A1 | 12/2005 | Rice | | |

FOREIGN PATENT DOCUMENTS

| | | |
|---|---|---|
| EP | 1300507 | 4/2003 |
| EP | 1553125 | 7/2005 |
| GB | 2263818 | 4/1993 |
| JP | 60037102 | 2/1985 |
| JP | 2005347571 | 12/2005 |
| WO | WO95/11129 | 4/1995 |

OTHER PUBLICATIONS http://composite.about.com/od/eqptprepreggers/a/What-Are-Prepregs.htm Mar. 4, 2012.*
http://www.plasticsintl.com/datasheets/Phenolic_G10_FR4.pdf Mar. 4, 2012.*

* cited by examiner

*Primary Examiner* — Mark Ruthkosky
*Assistant Examiner* — Christopher Polley
(74) *Attorney, Agent, or Firm* — W. Mark Bielawski; David J. Oldenkamp

(57) ABSTRACT

A composite material (1) comprising at least one prepreg (3), said prepreg comprising at least one polymeric resin and optionally at least one fibrous reinforcement; and a conducting ink (2) applied to at least one surface of said prepreg (3); where the conducting ink (2) has a surface tension lower than the surface energy of the at least one surface of said prepreg (3) to which the ink (2) is applied.

20 Claims, 2 Drawing Sheets

COMPOSITE MATERIAL

The present invention relates to composite materials, and particularly, but not exclusively, to fibre reinforced composite materials.

Generally, adhesive films, surfacing films, and pre-impregnated (prepreg) materials, based on fibre reinforcements, exhibit low electrical conductivity. The electrical conductivity exhibited is lower than is desirable for many applications of interest, such as electromagnetic shielding or lightning strike protection on aircraft. Materials incorporating carbon fibers do possess substantial electrical conductivity. However, the conducting pathway is only in the direction of the fibers, and for most polymeric thermosetting matrices there is only limited ability for electrical current to be dissipated in orthogonal directions.

Numerous solutions have been proposed to overcome the problem of limited electrical conductivity. Such attempts have included the application of "parasitic" metal meshes, foils and wires to the fibre reinforced assemblies. A metal mesh, or expanded foil may be placed on a prepreg surface with suitable preparation, and the resulting assembly cured to form a conducting component. However, the materials used for the meshes or foils to increase conductivity tend to be heavy, and significantly degrade the mechanical and aesthetic aspects of the composite. For example, copper mesh has an uneven surface, which in turn requires the use of additional resin before the surface can be satisfactorily painted. The consequent use of additional paint, which is normally not electrically conducting, therefore reduces the effectiveness of the conductive mesh.

Another proposed solution is the use of alternative materials in the prepreg. The resin in a prepreg can be made more electrically conductive by the addition of intrinsically conducting fillers. However, this does not usually result in improved conductivity in a direction perpendicular to the direction of the carbon fibers, and merely increases conductivity in the fibre direction.

The present invention seeks to provide a composite material which has improved electrical conductivity properties in comparison to prior attempts as described herein. The present invention further seeks to provide a method of making the composite material having improved electrical conductivity properties.

According to a first aspect of the present invention there is provided a composite material comprising;
 at least one prepreg comprising at least one polymeric resin and optionally at least one fibrous reinforcement; and
 a conducting ink applied to at least one surface of said prepreg;
wherein the conducting ink has a surface tension lower than the surface energy of the at least one surface of said prepreg to which the ink is applied.

If the optional reinforcement is not present, the composite of the invention might be in the form of an adhesive film or surfacing film. Although there would be no reinforcing fibers in such a case, fibers might be included in the form of a carrier or scrim. The latter could be woven, knitted or non-woven and might consist of non-reinforcing fibers, for example polyester, polyamide, cellulose or other natural or synthetic fibers.

According to a second aspect of the present invention there is provided a method of making a composite material comprising the steps of;
 providing at least one prepreg comprising at least one polymeric resin and optionally at least one fibrous reinforcement; and
 applying a conducting ink to at least one surface of said prepreg;
wherein the conducting ink has a surface tension lower than the surface energy of the at least one surface of said prepreg to which the conducting ink is applied.

Surprisingly it has been found that applying a solvent based ink onto an uncured prepreg does not result in the dissolving of the resin of the prepreg, thereby causing excessive flow of the prepreg. Furthermore, the ink printed as continuous lines on the prepreg surface surprisingly results in the formation of continuous lines of electrically conducting material in the final cured material. The invention has particular, but not exclusive, application in electromagnetic shielding and the manufacture of aircraft parts.

The conducting ink may be a metal based conducting ink. In one embodiment of the invention the ink is provided as a surface coating (in the horizontal x- and/or y-directions) in any suitable pattern, for example at least one line and/or grid. An interconnected pattern may be desirable. It is not desirable to provide plugs of conductive material extending (in the vertical z-direction) through the prepreg from surface to surface as this may adversely affect the mechanical properties of the final cured material.

The surface tension of the conducting ink is preferably in the range from 20 mN/m to 150 mN/m. More preferably, the surface tension is in the range from 20 mN/m to 130 mN/m. Most preferably, the surface tension of the conducting ink is in the range from 20 mN/m to 100 mN/m.

Surface tension is typically measured by the Wilhelmy plate method in which a rectangle of glass (24 mm wide by 0.15 mm thick) attached to a microbalance is introduced into the liquid (the speed of immersion of the plate in the fluid being 80 microns per second), and the resulting force on the plate is used to calculate surface tension: an alternative is the du Nuoy ring method which substitutes a platinum loop for the glass plate.

The conducting ink has a surface tension less than the surface energy of said prepreg to which the conducting ink is applied.

Prior analysis in the field has shown that the units of surface tension ($N \cdot m^{-1}$) are equivalent to joules per square meter ($J \cdot m^{-2}$). This means that surface tension can also be considered as surface energy. If a surface with surface tension $\sigma$ is expanded by a unit area, then the increase in the surface's stored energy is also equal to $\sigma$. In this way the surface tension of the conducting ink and the surface energy of the prepreg are comparable.

The surface tension of the conducting ink may be changed by addition of any suitable surface tension altering agent. Preferably, the surface tension altering agent is selected from surfactants, wetting agents, or a combination thereof.

The metal based conducting ink may comprise any metal suitable for providing an electrically conducting pathway. The metal is more preferably selected from copper, gold, silver, or any combination thereof. Carbon, though not a metal, may also provide a suitable level of electrical conductivity in admixture with a metal. Thus, in one embodiment, the metal based conducting ink is a carbon ink combined with a silver ink.

The metal based conducting ink may comprise metal particles. The metal particles may be in the form of flakes, spheres, dendrites, or any other suitable shape.

The size of the metal particles may be in the range from 10 nm to 100 µm, more preferably, in the range from 100 nm to 50 µm and most preferably, in the range from 500 nm to 50 µm.

The conducting ink may comprise a resin binder system.

The resin binder system may comprise a thermosetting or thermoplastic resin. The resin binder system more preferably comprises a thermosetting resin.

The term 'thermosetting' includes any suitable material which is plastic and usually liquid, powder, or malleable prior to curing and designed to be moulded in to a final form. Once cured, a thermoset is not suitable for melting and remoulding. Suitable thermosetting materials for the present invention include, but are not limited to, phenol formaldehyde based resins, urea-formaldehyde, 1,3,5-triazine-2,4,6-triamine (Melamine), polyesters, epoxide polymers, or any combination thereof.

The term 'thermoplastic' includes any suitable material which is plastic or deformable, and which melts to a liquid state upon heating. Suitable thermoplastic materials for the present invention include, but are not limited to, acrylics, celluloids, epoxide polymers, polyacrylates, polyacrylonitriles, polyamides, polybutylenes, poly carbonates, polyesters, polyethylenes, polyurethanes, polypropylenes, polystyrenes, poly phenylene oxides, or any combination thereof.

More preferably, the resin binder system may be selected from epoxy resins, acrylic resins, vinyl ester resins, phenolic resins, or any combination thereof. The thermoset material is more preferably an epoxy resin.

The resin binder system may be a one or two part system. The resin binder system may preferably be a one part system. One part systems are preferred to allow continuous operation and to enable long outlife to be achieved.

The resin binder system may comprise at least one solvent. The at least one solvent may be any solvent suitable for formulating or thinning conducting inks. More preferably, the at least one solvent is selected from alcohols, ketones, aromatic hydrocarbons, aliphatic esters and diesters, glycol esters including butyl cellosolve acetate, ethers including 1-methoxy-2-propanol and 2-(2-butoxyethoxy)ethanol, any other suitable solvent, or any combination thereof.

The at least one solvent may provide viscosity control.

The resin binder system may comprise monomer liquids. The monomer liquids may be selected from acrylics, methacrylics, styrenes, vinyl esters, other suitable monomers for radiation cured systems, or any combination thereof.

The conducting ink may also include additional ingredients such as performance enhancing or modifying agents. The performance enhancing or modifying agents, for example, may be selected from flexibilisers, toughening agents, accelerators, thermoplastics and core shell rubbers, flame retardants, wetting agents, pigments/dyes, UV absorbers, antifungal compounds, fillers, toughening particles and viscosity modifiers.

The conducting ink may be selected from any suitable conducting ink. Suitable conducting inks may be selected from commercially available inks, and, by way of example only, include those of:

XZ253, XZ251, XV800, XZ302, and XZ302-1 silver inks from Coates Circuit Products of Bath, UK;

102-05F, 105-43, 117-48, 120-07, 118-41 silver inks from Creative Materials of Tyngsboro, Mass., USA; and PI-2000, PI-2200, PI-2310, PI-2320, PI-2500, and PI-2600 highly conductive silver inks from Dow Corning of Midland, Mich., USA.

The surface energy of the prepreg is preferably in the range from 10 mN/m to 80 mN/m. More preferably, the surface energy is in the range from 20 mN/m to 70 mN/m. Most preferably, the surface energy of the prepreg is in the range from 30 mN/m to 70 mN/m.

Surface energy may be measured for a prepreg by a modification of the Wilhelmy plate method, described previously herein, in which the prepreg forms the suspended plate and at least two immersion fluids are used to define the contact angles from which the prepreg's surface energy may be determined.

The fibrous reinforcement of the prepreg may be selected from hybrid or mixed fibre systems which comprise synthetic or natural fibers, or a combination thereof. The fibrous reinforcement may preferably be selected from any suitable material such as fibreglass, carbon or aramid (aromatic polyamide) fibers. The fibrous reinforcement is most preferably carbon fibers.

The fibrous reinforcement may comprise cracked (i.e. stretch-broken) or selectively discontinuous fibers, or continuous fibers. It is envisaged that use of cracked or selectively discontinuous fibers may facilitate lay-up of the cured composite material prior to being fully cured according to the invention, and improve its capability of being shaped.

The fibrous reinforcement may be in a woven, non-crimped, non-woven, unidirectional, or multiaxial textile structure form.

The woven form may be selected from a plain, satin, or twill weave style. The non-crimped and multiaxial forms may have a number of plies and fibre orientations.

Such styles and forms are well known in the composite reinforcement field, and are commercially available from a number of companies including Hexcel Reinforcements of Villeurbanne, France.

The polymeric resin of the prepreg preferably comprises at least one thermoset resin.

The term 'thermoset resin' includes any suitable material which is plastic and usually liquid, powder, or malleable prior to curing and designed to be moulded in to a final form. Once cured, a thermoset resin is not suitable for melting and remoulding. Suitable thermoset resin materials for the present invention include, but are not limited to, resins of phenol formaldehyde, urea-formaldehyde, 1,3,5-triazine-2,4,6-triamine (Melamine), bismaleimide, vinyl ester resins, benzoxazine resins, phenolic resins, polyesters, cyanate ester resins, epoxide polymers, or any combination thereof.

The thermoset resin is preferably selected from epoxide resins, cyanate ester resins, bismaleimide, vinyl ester, benzoxazine and phenolic resins.

The thermoset resin may be any suitable thermoset resin. Suitable thermoset resins may be selected from commercially available resins, and, by way of example only, include those (sold in the form of prepregs) of;

HexPly® M9.1 and M 9.6 range available from Hexcel Composites, Duxford, England;

WE 90 and WE 91 from SP Systems, Isle of Wight, England; and

LTM and MTM materials from the Advanced Composites Group, Heanor, England.

The thermoset resin preferably comprises at least one of bisphenol-A (BPA) diglycidyl ether and bisphenol-F (BPF) diglycidyl ether and derivatives thereof; tetraglycidyl derivative of 4,4'-diaminodiphenylmethane (TGDDM); triglycidyl derivative of aminophenols and other glycidyl ethers and glycidyl amines well known to the art; and at least one curing agent, particularly preferred examples of curing agent including dicyandiamide; 4,4'-diaminodiphenylsulfone; 3,3'-diaminodiphenylsulfone; 4,4'-diaminodiphenylmethane; or other curing agents well known in the art.

The thermoset resin may also comprise an accelerator which is typically a urone. Suitable accelerators, which may be used alone or in combination include N,N-dimethyl, N'-3,4-dichlorphenyl urea (Diuron), N'-3-chlorophenyl urea (Monuron), and preferably N,N-(4-methyl-m-phenylene bis [N',N'-dimethylurea] (UR500).

The thermoset resin is applied to the fibrous reinforcement. The fibrous reinforcement may be fully or partially impregnated by the thermoset resin. In an alternate embodiment, the thermoset resin may be a separate layer which is proximal to, and in contact with, the fibrous reinforcement, but does not substantially impregnate said fibrous reinforcement.

The prepreg may also include additional ingredients such as performance enhancing or modifying agents. The performance enhancing or modifying agents, for example, may be selected from flexibilisers, toughening agents, accelerators, thermoplastics and core shell rubbers, flame retardants, wetting agents, pigments/dyes, UV absorbers, anti-fungal compounds, fillers, toughening particles and viscosity modifiers.

The prepreg may be in the form of continuous tapes, towpregs, webs, or chopped lengths (chopping and slitting operations may be carried out at any point after printing). The prepreg may be an adhesive or surfacing film and may additionally have embedded carriers in various forms both woven, knitted, and non-woven.

The conducting ink is applied to the surface of said prepreg. Preferably, the conducting ink is printed on the surface of said prepreg. Other suitable techniques for application of the conducting ink to surface of said prepreg material include, by way of example, painting, embossing, or engraving.

Printing techniques that can be used include any suitable method. Preferable printing techniques may be selected from gravure, lithography, or screen printing. Screen printing is the most preferred technique. Screen printing is most preferred as it provides clear, well defined tracks with good coverage of the prepreg. Screen printing can be carried out with static or rotary screens, but the later is preferred for manufacturing continuous lengths of printed prepreg.

Coating weights of conducting inks vary depending on the pattern and means of printing. Preferably the coating weight of the conducting ink for a typical pattern is in the range 1 to 100 gm$^{-2}$. More preferably, the coating weight is in the range 2 to 50 gm$^{-2}$. Most preferably, the coating weight is in the range 2 to 20 gm$^{-2}$.

The conducting lines, formed by the conducting ink, can be printed in patterns that are otherwise difficult or impossible to make using metal wires. For example, tracks and channels can be printed that would enable air to escape during consolidation and cure of the composite material, and thereby serve a dual purpose.

The composite material of the invention may be fully cured using any suitable temperature pressure and time conditions known in the art.

Thus, according to a third aspect of the present invention there is provided a method of making a cured composite material comprising the steps of the second aspect, and curing the composite material using any known curing method.

The composite material may more preferably be cured using a method selected from UV-visible radiation, microwave radiation, electron beam, gamma radiation, or other suitable non-thermal radiation after the application of the conducting ink to the at least one surface of said prepreg.

The cure conditions of the conducting ink are preferably substantially similar to the cure conditions of the at least one prepreg.

It has surprisingly been found that, after cure, there is little or no diffusion of the metal particles of the conducting ink, and the printed cured conducting lines maintain high conductivity.

Mesh structures or other patterns can easily be printed. As the printed lines are shallower then metal wires, there is a weight saving of typically 80-90% over the weight of copper mesh. Additionally, the printing process can be integrated in to the prepreg manufacturing process in a way that is difficult or impossible with the addition of wire meshes.

Tack is an important factor in determining the handling characteristics of composite materials. Materials, such as the conducting inks used in the present invention, are based on heat curable thermosetting resin chemistry and therefore the printed conducting lines remain tacky after printing. Therefore, use of conducting inks of the present invention results in no overall loss of tack as would otherwise be observed if a metal mesh wire were to be applied to a prepreg surface. The tack of the printed conducting lines formed by the conducting inks of the present invention disappears completely during cure.

The resulting cured composite material has a surface, and/or bulk, conductivity in all directions.

Metals can be deposited on to prepregs using electroless deposition or sputtering methods, but these methods involve complex processes and either the immersion of the prepreg in to aqueous chemical baths (for electroless deposition), or transporting the prepreg through high vacuum chambers (for sputtering methods), neither of which can easily be achieved with continuous fast processes.

Multiple layers of conductively printed composite materials may be used. Thus, by way of example, an assembly may be prepared using 12 plies of standard non-printed composite materials, and 4 plies of conductively printed composite materials of this invention, thus enhancing the surface conductivity of the final assembly. As a further example, a laminate assembly could be prepared from 12 plies of standard composite materials and a conductively printed composite material with no carbon fibre reinforcement. Optionally, where a conductively printed surface composite material is used, an electrically isolating layer can be placed between the carbon fibre plies and the printed resin surface. For example, a glass reinforced fibrous layer can be used as the isolating layer. It is understood that there are many possible assemblies that could be used, and these are by way of example only.

A further benefit is that the composite material of the present invention prior to being fully cured is completely flexible, and is suitable for automated tape lay up processes which are increasingly used in the manufacture of large composite structures in the aerospace industry.

All of the features described herein may be combined with any of the above aspects, in any combination.

In order that the present invention may be more readily understood, reference will now be made, by way of example, to the following description and accompanying drawings, in which.

Figure 1:
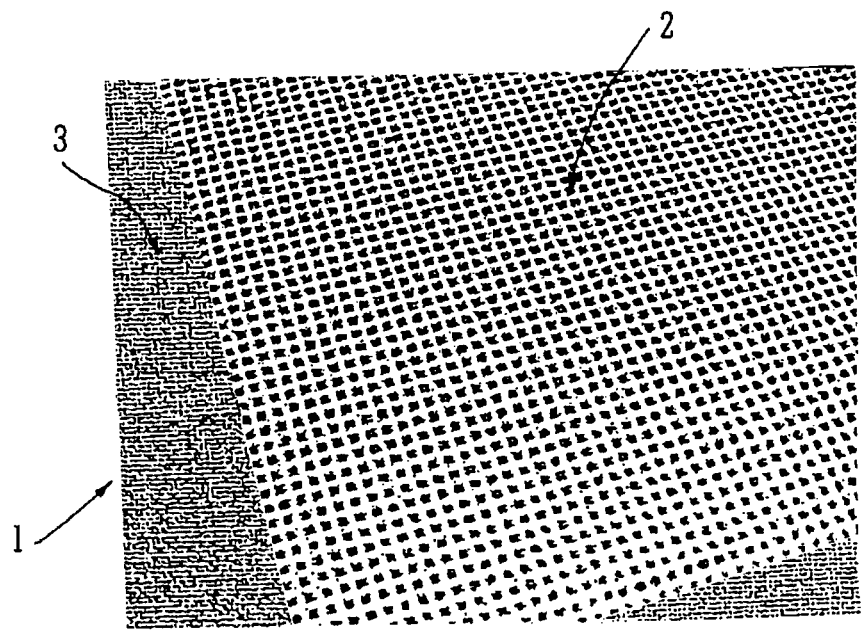
FIG. 1 is a composite material prior to being fully cured in accordance with the present invention.

Referring to FIG. 1, there is shown a composite material 1 prior to being fully cured. The material 1 shown is printed using an A4 90 mesh PET printing screen obtained from Mascoprint, Hemel Hemptead, Hertfordshire, England. The composite material 1 has printed on the prepreg surface layer 3 a conducting ink pattern 2. The conducting ink pattern 2 is in the form of a square mesh, with a pitch of 1.7 mm and a line thickness of 0.4 mm. The conducting ink 2 used is Coates type Z253 thermosetting silver ink, 83% solids, commercially obtained from Coates Circuit Products, Norton Hill, Midsomer Norton, Bath, UK.

The prepreg 3 used is Hexcel Hexply M21, 35% resin, 268 gm$^{-2}$ IM7 carbon fibre. Solvent from the conducting ink 2 pattern was removed with an air stream at room temperature over a period of 30 minutes. The composite material 1 can be slightly warmed during drying to aid levelling of the surface.

The composite material 1 of FIG. 1 can have a siliconised release paper applied, and the material 1 stored in a freezer until required. The material 1 was laid up as the top ply of a 16 ply unidirectional laminate, and subsequently fully cured at 180° C. for 2 hours. The coating weight of the resulting dry conducting ink pattern was found to be 18 gm$^{-2}$.

Figure 2:
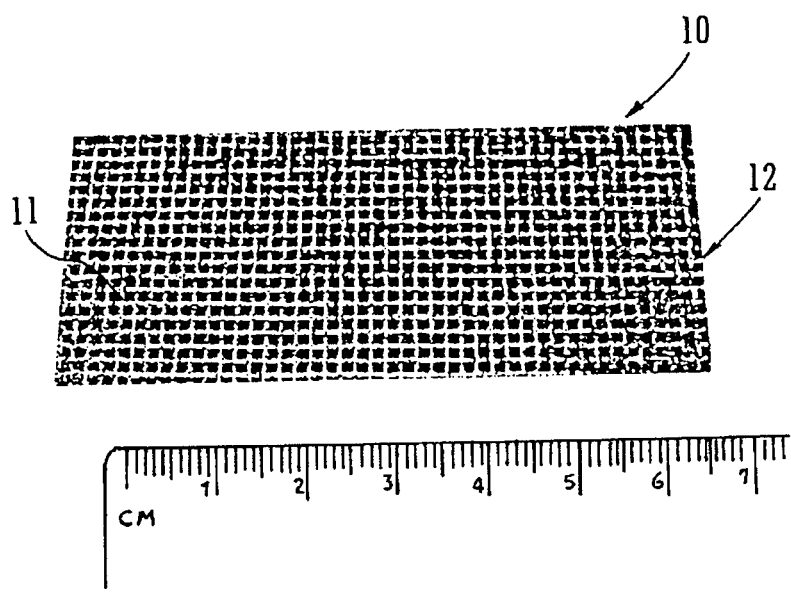
FIG. 2 is a cured composite material.

Referring to FIG. 2, there is shown an example of a fully cured composite material 10. The conducting ink pattern 11 comprises silver ink tracks, which are essentially unaffected by the curing process and remain electrically conductive.

A rectangular specimen of the material 10 with dimensions 116×38 mm was cut with the fibre direction running perpendicular to the long side of the specimen. The ends of the specimen were coated with copper by brush coating, and the electrical resistance of the specimen measured. The resistance of the assembly was 14 ohms, as compared with 90 ohms for an identical assembly with no silver ink. This demonstrates a significantly reduced electrical resistance for a composite material may be achieved by means of this invention.

Figure 3:
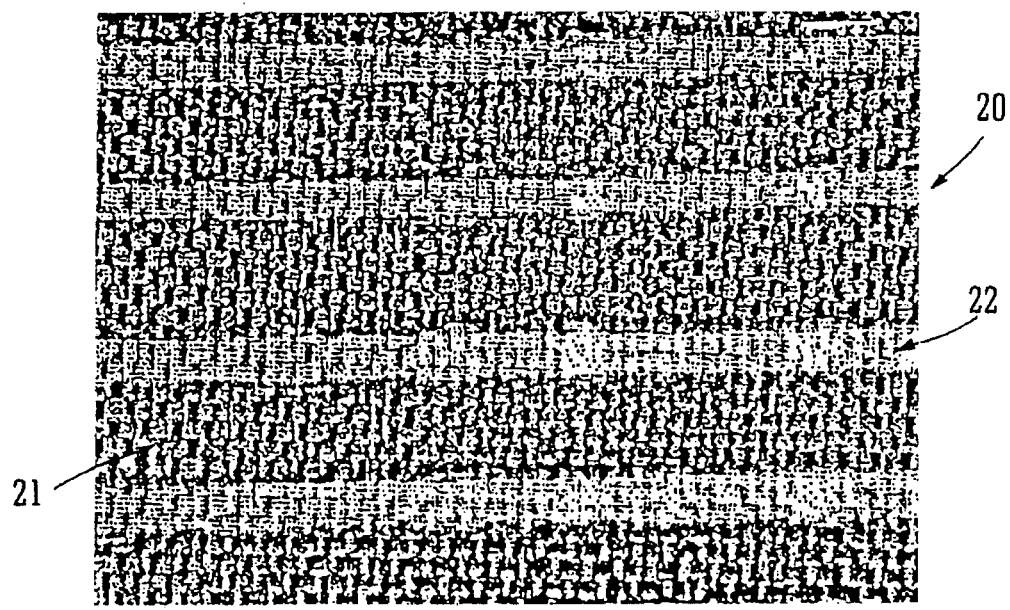
FIG. 3 is a further cured composite material.
Figure 4:
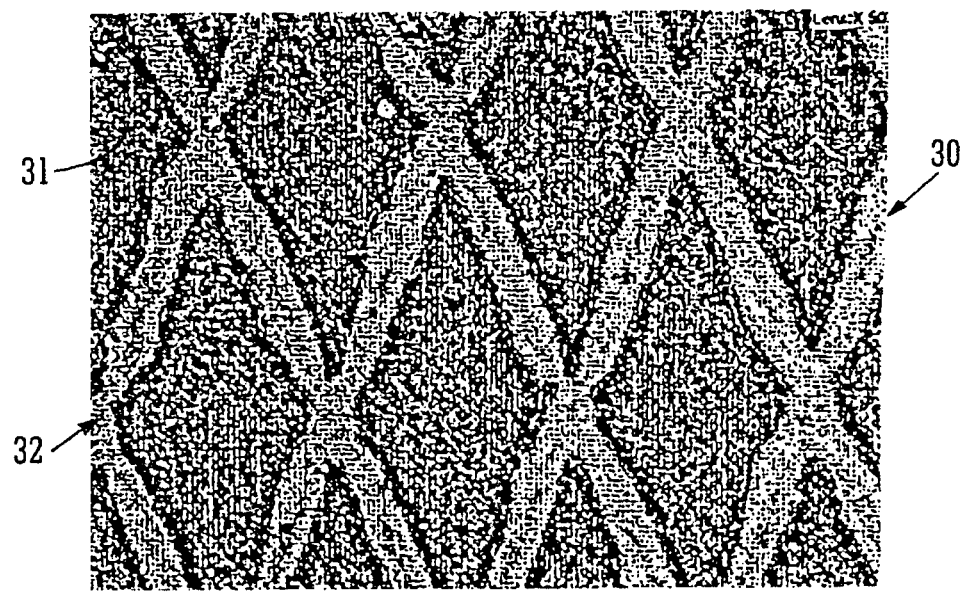
FIG. 4 is a further cured composite material.

Referring to FIG. 3 and FIG. 4, there are shown further examples of fully cured composite materials 20 and 30. The materials 20 and 30 were formed from composite materials comprising prepregs Hexply 8552 and M21.

The conducting ink 22 and 32 was printed on the surface of the composite materials prior to being fully cured in order to form conducting lines and patterns. The solvent in the conducting inks 22 and 32 was removed with an air stream, and the composite materials were warmed slightly during drying to aid levelling of the surface. A siliconised release paper was also applied. The conducting ink 22 and 32 used is a silver containing ink 22 and 32 commercially obtainable from Coates Circuit Products, Norton Hill, Midsomer Norton, Bath, UK (type Z253).

The resultant areal weight of the conducting inks 22 and 32 after application was around 9.4 gm$^{-2}$ for 40% coverage. The composite materials were fully cured using conventional known curing cycles to form the cured materials 20 and 30. After curing, the electrical resistance of a typical 1 cm length (0.5 mm wide) was found to be 1 ohm.

The fully cured composite materials 20 and 30 of FIG. 3 and FIG. 4 show two different conducting ink 22 and 32 patterns printed on the surfaces. FIG. 3 shows a pattern comprising a plurality of parallel lines of conducting ink 22. FIG. 4 shows a criss-cross pattern with intersecting conducting ink lines 32.

It can be appreciated that any suitable pattern of conducting ink may be printed on to the prepreg surface prior to being cured.

It is to be understood that the invention is not to be limited to the details of the above embodiments, which are described by way of example only. Many variations are possible.

The invention claimed is:

1. A composite material comprising:
    an uncured prepreg comprising at least one uncured thermosetting resin and fibers, said uncured prepreg comprising a tacky surface comprising said uncured thermosetting resin and wherein said tacky surface has a surface energy; and
    a pattern located on said tacky surface, said pattern comprising continuous lines of conducting ink wherein the conducting ink is a liquid that is tacky and has a surface tension wherein the surface tension of said conducting ink is lower than the surface energy of said uncured surface.

2. A composite material according to claim 1 wherein said conducting ink comprises metal particles.

3. A composite material according to claim 1 wherein said conducting ink comprises a resin binder system, said resin binder system comprising a thermosetting resin and a solvent for said thermosetting resin.

4. A composite material according to claim 1 wherein said fibers are selected from the group consisting of reinforcing fibers and non-reinforcing fibers.

5. A composite material according to claim 4 wherein said non-reinforcing fibers are woven, knitted or non-woven.

6. A composite material according to claim 5 wherein said non-reinforcing fibers comprise fibers selected from the group consisting of polyester fibers, polyamide fibers and cellulose fibers.

7. A composite material according to claim 4 wherein said fibers are fibers.

8. A composite material according to claim 7 wherein said reinforcing fibers comprise continuous fibers, stretch-broken fibers or selectively discontinuous fibers.

9. A composite material according to claim 7 wherein said reinforcing fibers are in a woven, non-crimped, non-woven, unidirectional or multiaxial structure form.

10. A composite material according to claim 7 wherein said reinforcing fibers comprise carbon fibers, fiberglass or aramid fibers.

11. A composite material according to claim 2 wherein said metal particles comprise copper, gold or silver.

12. A composite material according to claim 1 wherein said conducting ink comprises carbon particles.

13. A composite material according to claim 2 wherein said conducting ink also comprises carbon particles.

14. A composite material according to claim 2 wherein said metal particles have a size that is in the range from 10 nanometers to 100 micrometers.

15. A composite material according to claim 1 wherein said uncured thermosetting resin is an epoxide resin, cyanate ester resin, bismaleimide, vinyl ester, benzoxazine or phenolic resin.

16. A composite material according to claim 3 wherein said resin binder comprises a thermosetting resin selected from the group consisting of epoxy resins, acrylic resins, vinyl ester resins and phenolic resins.

17. A composite material according to claim 16 wherein said solvent is selected from the group consisting of alcohols, ketones; aromatic hydrocarbons, aliphatic esters, aliphatic diesters and glycol esters.

18. A composite material according to claim 1 in which a release paper is releasably attached to said tacky surface.

19. A composite material according to claim 18 wherein said release paper is siliconised release paper.

20. A composite material according to claim 15 wherein said uncured thermosetting resin comprises at least one curing agent.

* * * * *